Feb. 26, 1963

H. P. KOPPEHELE 3,078,504

METHOD AND APPARATUS FOR BIAXIAL
STRETCHING OF BEADED EDGE FILM

Filed March 16, 1960

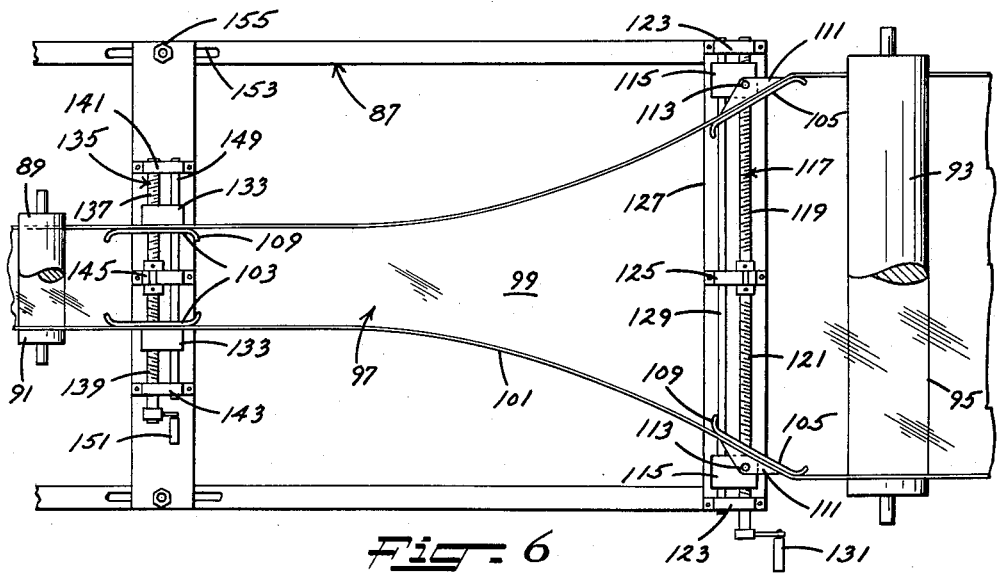
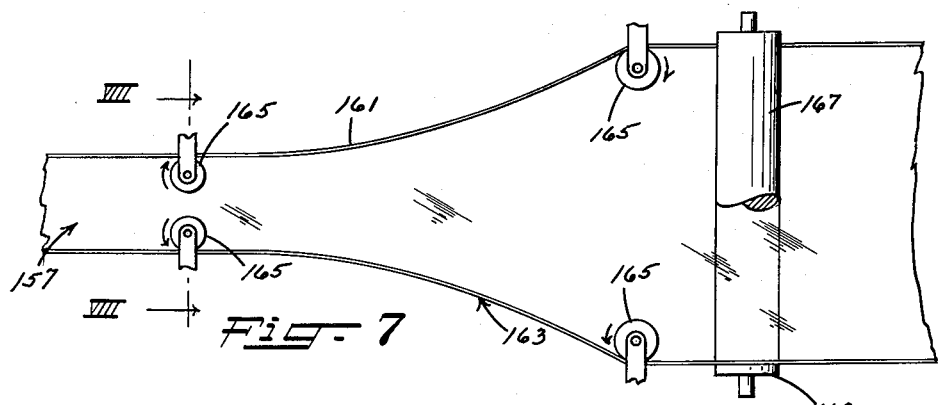
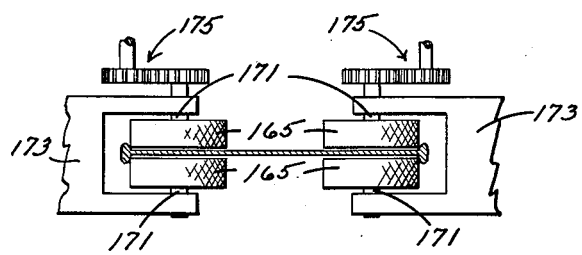

United States Patent Office 3,078,504
Patented Feb. 26, 1963

3,078,504
METHOD AND APPARATUS FOR BIAXIAL STRETCHING OF BEADED EDGE FILM
Hugo Paul Koppehele, Glen Riddle, Pa., assignor to American Viscose Corporation, Philadelphia, Pa., a corporation of Delaware
Filed Mar. 16, 1960, Ser. No. 15,481
10 Claims. (Cl. 18—1)

The present invention relates to the manufacture of plastic films or sheets and particularly to a method and apparatus for stretching of crystalline polymeric materials to improve the properties thereof.

In the conventional manufacture of films from polymeric materials, as for example from polyethylene and polypropylene polymers, the molten polymer is extruded as a continuous sheet and is then rapidly quenched, as for example by a cooling liquid or gas. To convert this film to a more useful article, the film is generally oriented by being stretched, preferably simultaneously, in two mutually perpendicular or biaxial directions to form a substantially balanced and superior film in which the physical properties, such as tensile strength, elongation, etc., are substantially the same as measured in both directions.

To facilitate longitudinal and transverse stretching of a continuous film, a conventional practice is to initially form the film with thickened or beaded longitudinal edges which are adapted to slidably engage with stationary metal tracks. The tracks serve to restrain the film beads against transverse movement as the film is conveyed and drawn in a longitudinal direction by a suitable take-up means which is operated at a faster rate of speed than that at which the film is delivered into the tracks. The tracks are disposed in diverging relationship when a biaxial stretching of the film is desired with the film usually being heated during the actual stretching operation, or alternatively, being preheated just prior to the stretching stage.

When subjecting laterally unrestrained plastic structures to longitudinal tensions, it has been found that substantially similar stretching patterns result, with stretching of the film occurring along a generally "natural" length of the structures. These stretching patterns are apparently not influenced by the rate of stretching, the ultimate degree of stretch attained or the distance between the point at which the plastic structure is gripped or snubbed and the point of application of the longitudinal tensions. In applying longitudinal tensions to laterally unrestrained films formed of polymeric materials, for example, longitudinal stretching of the film is confined to a "natural" length of the film which immediately precedes the point at which such tensions are applied, and is accomplished by a transverse narrowing or necking of the film wherein the film edges bow inwardly toward each other.

In biaxially stretching beaded edge polymeric films with a conventional diverging track arrangement longitudinal stretching of the film occurred, as described above, within a "natural" length of film immediately preceding the take-up or tensioning means. In view of the diverging relationship of the tracks, however, transverse tensions were exerted on the film web throughout its travel through the stretching zone so that a true biaxial stretching of the film was not achieved. To further complicate this stretching behavior, the film beaded edges, in addition to conveying the film through the stretching zone, are subjected to both longitudinal and transverse stretching tensions, and must therefore overcome the frictional effects arising from:

(1) The drag of the film through the preheater and tracks.

(2) The transverse tensions of the bead on the track resulting from the narrowing of the film due to the longitudinal stretching.

(3) The transverse stretching tensions arising from the forces required to stretch the film transversely as the tracks diverge.

The frictional effects attributed to the film drag as it travels through the preheater and stretching zones, for example, can be minimized by employing a preheater and stretching tracks which are as short as possible, yet adequate to perform their necessary functions at practical operating speeds. In addition, a positive driven film bead metering device, such as disclosed in my pending United States patent application Serial No. 4,081 filed January 22, 1960, may be mounted within or adjacent to the entrance of the film stretching zone. The metering device would serve to relieve the film bead of the frictional effects which are developed as the film travels through the preheating zone, and would also impart a desired momentum or driving force to the film as it enters the stretching zone.

With conventional film-stretching procedures and apparatus, the remaining frictional effects noted above can be reduced only by elevating the temperature of the film web to enhance its plastic flow characteristics. However, to insure that a desired molecular orientation of the film web accompanies the biaxial stretching forces which are imposed upon the film, the temperature of the film web must, of course, be below the range wherein plastic or molecular flow occurs without achieving molecular orientation. It has been found that these remaining frictional effects are of such magnitude, especially at high speed or commercial operations, as to produce a stretch pattern in which the majority of transverse stretching of the film web is completed before the longitudinal stretching of the film is commenced. For example, in using a conventional stretching apparatus having a stretching zone of 60 inches as heretofore described, studies have shown that longitudinal stretching of the film originated and was completed during the final fifteen inches of the stretching zone, after almost all of the transverse stretching of the film web was completed. Thus, instead of achieving a true simultaneous biaxial stretching of the film, the known film-stretching apparatus provides for a two-stage stretching pattern, accompanied by complex frictional effects. Accordingly, a primary object of this invention is to provide a new or generally improved and more satisfactory method and apparatus for biaxially orienting thermoplastic polymeric films.

Another object is the provision of an improved method and apparatus for effecting a substantially simultaneous transverse and longitudinal biaxial stretching of beaded edge thermoplastic polymeric films.

Still another object is to provide an improved apparatus for biaxially stretching beaded edge thermoplastic films in which the frictional effects exerted on the film are minimized and are actually utilized in coordinating the transverse and longitudinal film-stretching patterns.

A further object is to provide an improved film-stretching method and apparatus wherein the film being stretched is subjected to a minimum of frictional forces during actual stretching thereof.

These and other objects and advantages of the invention will become apparent from the following description and accompanying drawing in which:

FIGURE 6 is a view similar to FIGURE 1 illustrating a modified film stretching apparatus of the present invention;

FIGURE 7 is a view similar to FIGURES 1 and 6 illustrating a still further modification of the present invention; and FIGURE 8 is a vertical section taken along the line VIII—VIII of FIGURE 7.

Figure 1:
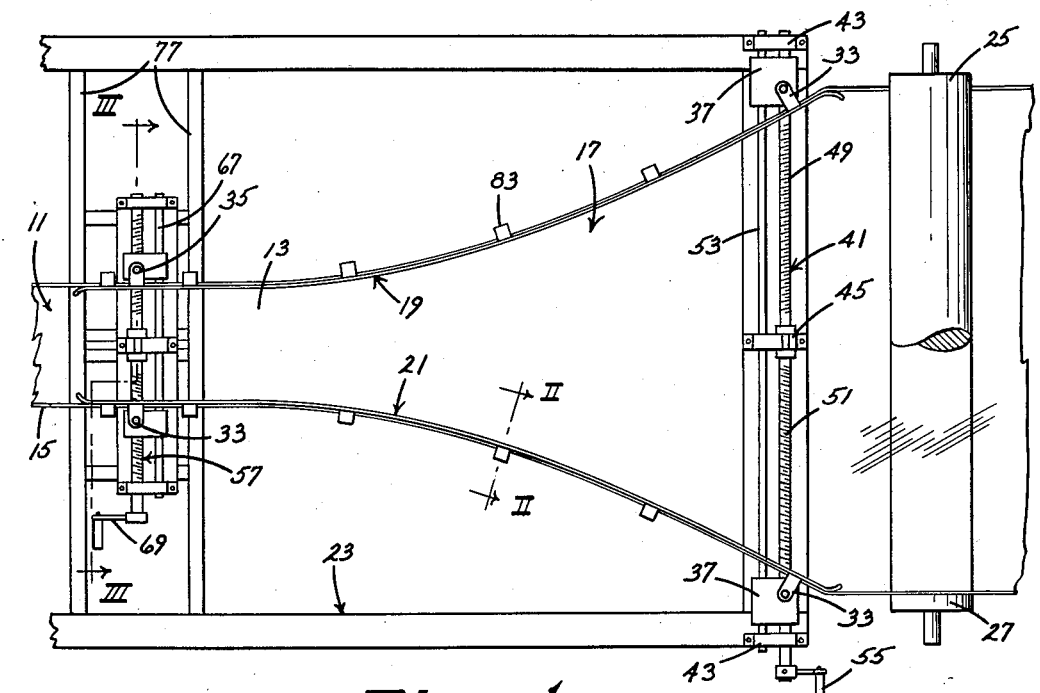
FIGURE 1 is a plan view of one form of apparatus of the present invention.

In general, the present invention is directed to a method and apparatus for effecting a simultaneous biaxial orientation of beaded-edge polymeric films by coordinating the transverse stretching profile of the film web with the longitudinal stretching profile which the film tends to naturally assume in response to applied longitudinal tensions. As understood in the art, the stretching profiles serve to illustrate the percentage of the total elongation or stretch accomplished at various points along a stretching zone of a specified length and comprise curves which are obtained by plotting, opposite each point of measurement, the percentage of stretch accomplished as obtained by the formula $$\left(\frac{V}{V_o} - 1\right) \times 100\%$$

wherein:

V is the surface velocity of the film at any desired point of the stretching zone; and $V_o$ is the surface velocity of the film at the point of the stretching zone at which film stretching originates.

To achieve the above-noted objective, the apparatus of the present invention includes take-up means for continuously advancing and applying longitudinal tensions to the film and means for engaging with and guiding along divergent paths those portions of the film beads which are undergoing elongation.

In one embodiment of the invention, the beaded-edges of the film are engaged by flexible tracks which define a film-stretching zone through which the film is advanced by a take-up means. At the exit of the stretching zone, the tracks are fixed against longitudinal movement but are adapted to be adjusted laterally of the film path to impose desired transverse tensions on the film web. At the entrance to the stretching zone, the tracks are floatingly supported to permit variations in the length of the stretching zone as the tracks are adjusted laterally at the stretching zone exit.

With this construction, the film is advanced along the flexible tracks by the take-up means which is operated at such a speed as to induce longitudinal tensions on the film. As heretofore mentioned, the longitudinal tensions will effect stretching along a generally "natural" length of the film; namely, along that area of film immediately preceding the take-up means and within the terminal portion of the stretching zone. The tracks at the exit of the stretching zone are adjusted to impose transverse tensions on the film web to thus effect transverse stretching of the film web simultaneously with the longitudinal stretching of the film.

As the film is advanced through the stretching zone, the transverse tensions imposed on the film beaded-edges as the film moves along the diverging portions of the tracks serve to actually squeeze the flexible tracks together. This, in turn, leads to a reduction in the transverse tensions developed by the film beaded-edges on the tracks due to the narrowing or necking of the film in response to the applied longitudinal tensions, as well as a decrease in the length of the flexible tracks which are in contact with the film beaded-edges during the actual stretching operation.

In view of this latter effect, the transverse tensions imposed upon the film beaded-edges as the film moves along the diverging track portions are further minimized. Thus, as the tracks flex into a condition which is in equilibrium with the tensions to which it is exposed, the frictional effects on the film beaded-edges are reduced to a minimum and actually harnessed to assist in achieving and maintaining the desired transverse film-stretching profile.

In a second embodiment of the invention, substantially the same results as described above are obtained by employing track sections at only the entrance and exist of the film-stretching zone. The track sections at the exit of the stretching zone; that is, adjacent to the film take-up means, are fixed against longitudinal movement but are capable of being adjusted laterally.

In a still further modification of the invention pairs of cooperating rollers engage with each of the film beaded-edges at the entrance and exit to the stretching zone, with the pairs of rollers at the latter location being adapted to be adjusted laterally to effect desired transverse stretching of the film web. With this particular arrangement, the frictional effects on the film beaded edges are practically eliminated completely.

The method and apparatus of the present invention is hereafter described as being employed with the preheating arrangement as disclosed in my pending application entitled Method and Apparatus for Stretching Beaded Edge Films, Serial No. 861,797, filed December 24, 1959, wherein the film web is heated to a higher temperature than the film beads prior to stretching to thus confine transverse film stretching substantially to the film web. In addition, it is preferred that the film being stretched in accordance with the present invention be delivered into the stretching zone at a uniform and constant rate of speed, as for example in a manner and by the use of a metering device as disclosed in my above-noted application, Serial No. 4,081. The following description will thus set forth a preferred environment and application of the present invention. It will be understood, however, that the teachings of the present invention are also equally well adapted for use with films which are preheated by means other than that disclosed in the above-noted application or heated during actual stretching operations. Further, satisfactory results can be obtained by using conventional film delivery means in lieu of the metering device mentioned above.

Figures 2, 3:
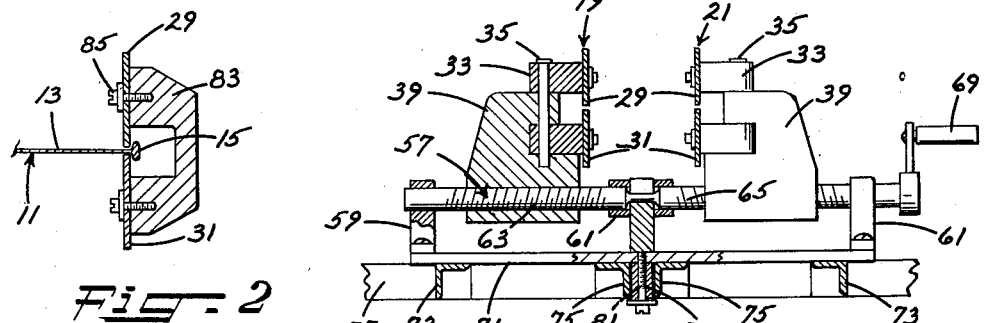
FIGURE 2 is a vertical section taken along the line II—II of FIGURE 1.
FIGURE 3 is a vertical section taken along the line III—III of FIGURE 1.

With reference to FIGURES 1–3 of the drawing for a more detailed description of the invention, the film to be stretched, indicated at 11, is of conventional configuration having a web 13 of substantially uniform thickness and enlarged or beaded longitudinal edges 15. The film 11 is preferably preheated as by the method and apparatus disclosed in my above-noted copending application Serial No. 861,797 and is advanced into a stretching zone, generally indicated at 17, by a metering device as described in my above-mentioned application Serial No. 4,081.

The stretching zone 17 is defined by a pair of flexible tracks 19 and 21 which are supported by a frame 23 positioned between a film delivery or metering device (not shown) and a pair of take-up rolls 25 and 27. As best seen in FIGURES 2 and 3, the tracks 19 and 21 each consist of a pair of spaced flexible plates 29 and 31 between which the film web 13 is adapted to travel as the film is advanced through the stretching zone. To facilitate transverse adjustment of the tracks 19 and 21 toward and away from each other, the terminal portions of the plates 29 and 31 are each provided with lugs 33 which are pivotally connected by pins 35 to carriages 37 and 39 disposed adjacent to the exit and entrance of the stretching zone, respectively.

As best seen in FIGURE 1 of the drawing, the carriages 37 are simultaneouly adjusted toward and away from each other by an elongated screw 41 which is rotatably mounted in end bearing plates 43 and a center support bearing 45 fixed to a cross bar 47 of the frame 23. The screw 41 extends through the carriages 37 and is provided with threads 49 and 51 of opposite pitch which mesh with corresponding threads formed in the carriages themselves. A guide rod 53, fixed to the bearing plates 43, slidably supports the carriages 37 and serves to prevent rotation of the same as the screw 41 is turned by a crank 55 fixed to one end thereof.

The carriages 39 at the entrance of the stretching zone 17 are generally similar to the carriages 37 described above and are simultaneously adjusted toward and away from each other by a screw 57 which is rotatably supported by end bearing plates 59 and a center support bearing 61. The screw 57 extends through the carriages 39 and is provided with threads 63 and 65 of opposite pitch which mesh with corresponding threads formed in the carriages themselves. A guide rod 67 extends through the carriages 39 and is fixed to the end bearing plates 59 for preventing rotation of the carriages as the screw 57 is turned by a crank 69 fixed to one end thereof.

To facilitate floating support of the carriages 39 along a path extending longitudinally of the stretching zone, the end bearing plates 59 and the center support bearings 61 are fixed to a slide block 71 which in turn rides along angle bars 73 and 75 disposed between cross bars 77 of the frame 23. As best seen in FIGURE 2, a roller 79 is mounted on the underside of the slide block 71 by a screw 81 and rides between opposing flanges of the angle bars 75 to thus guide the slide block 71 along a desired longitudinal path.

Prior to the commencement of stretching operations the flexible plates 29 and 31 forming each of the tracks 19 and 21 are adjusted to provide a desired gap therebetween. As shown in FIGURE 2, U-shaped stiffeners 83 are fixed by screws 85 to the plates 29 and 31 at longitudinally spaced intervals to impart stability into the tracks and to assist in maintaining the track plates in preset positions.

With the tracks 19 and 21 positioned in substantially parallel relationship the film 11, preferably in a preheated condition, is laced between the flexible plates of the respective tracks and then passed between the take-up rolls 25 and 27. The speed of the take-up rolls 25 and 27 is then gradually increased until the desired longitudinal tensions are imposed upon the film. As heretofore described, the applied tensions will effect longitudinal stretching of the film along a somewhat fixed or "natural" length of the film as it moves through the terminal or exit portion of the stretching zone. The screw 41 is then actuated to urge the carriages 37 away from each other until a desired degree of transverse stretching of the film web is obtained. If necessary, heating means may be positioned along one or opposite sides of the film path as it moves through the stretching zone to heat or maintain the film at an optimum stretching temperature.

As the film is advanced through the stretching zone, the transverse tensions exerted on the tracks as the film beads move along the diverging track portions serve to actually flex the tracks into a contour approaching that which the film beads tend to assume in response to the applied longitudinal tensions. This reaction of the flexible tracks, as previously mentioned, minimizes the frictional effects imposed upon the film beads and thereby in no way disturbs the simultaneous application of transverse and longitudinal stretching tensions to the film during its travel through the terminal or exit portion of the stretching zone.

Figure 4:
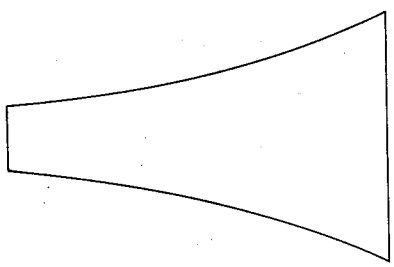
FIGURE 4 is a schematic view illustrating the contour assumed by a pair of flexible stretching tracks of the present invention when no film is laced therebetween.
Figure 5:
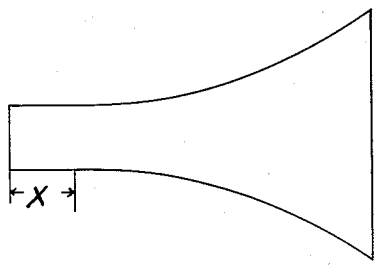
FIGURE 5 is a view illustrating the contour assumed by the tracks of FIGURE 4 during actual film-stretching operations in accordance with the present invention.

To more clearly explain the reaction of the stretching tracks to the applied transverse stretching tensions, reference is made to FIGURES 4 and 5 of the drawing which diagrammatically illustrate pairs of flexible stretching tracks which are of similar length and which have been adjusted to substantially the same transverse spacing at their respective terminal portions. No film is laced between the stretching tracks of FIGURE 4, while FIGURE 5 illustrates the contour of the flexible tracks during stretching operations in accordance with the present invention. It will be noted that under operating conditions, as shown in FIGURE 5, the tracks are actually flexed by the transverse stretching tensions into curvatures of smaller radius than the corresponding tracks of FIGURE 4, and that this difference in track contour is accompanied by a decrease in the length of the stretching zone, as indicated at $x$ in FIGURE 5. In effect, the transverse stretching tensions arising from the forces required to stretch the film transversely as the film travels along the diverging portions of the tracks serve to squeeze or urge the tracks toward each other and thus flex the same into a contour as shown in FIGURE 5.

In further comparing the track contours of FIGURES 4 and 5, it will be apparent that with the latter arrangement the tracks more closely approach paths which the film beads tend to assume under longitudinal tensioning, and that the transverse stretching tensions are applied to the film web rather abruptly thereby subjecting a minimum length of the track to the transverse tensions which arise during the transverse stretching phase. Thus, as a result of both of these factors, the application of the transverse stretching tensions is achieved while the film travels along the terminal or exit portion of the stretching zone, that is, simultaneously with the longitudinal tensions developed within the film by the take-up rolls 25 and 27, to provide for a true biaxial stretching of the film.

Referring to FIGURE 6 of the drawing, the apparatus there illustrated includes a support frame 87 positioned between feed rolls 89 and 91, and take-up rolls 93 and 95 which together cooperate in advancing a conventional film 97 having a web 99 and longitudinal beaded edges 101. Pairs of short or sectional tracks 103 and 105 are carried by the frame 23 between and adjacent to the feed rolls and take-up rolls, respectively, and together define a film-stretching zone, as generally indicated at 107. The tracks of each pair of tracks 103 and 105 are of similar construction, each including a pair of spaced plates which are adapted to engage with the film beads 101 while permitting unrestrained travel of the film web 99 therebetween. To avoid jamming or damage to the film, the tracks are preferably formed with inturned ends as shown at 109.

The tracks 105 forming the exit portion of the stretching zone 107 are provided with lugs 111 which are pivotally connected by pins 113 to carriages 115 mounted on an elongated screw 117. The screw 117 is provided with threads 119 and 121 of opposite pitch which mesh with corresponding threads formed in the carriages themselves, and is rotatably supported by end bearing plates 123 and a center support bearing 125 fixed to cross bar 127 of the support frame 87. A guide rod 129, fixed to the bearing plates 123, slidably supports the carriages 115 and prevents rotation of the same as the screw 117 is turned by a crank 131 fixed to one end thereof.

At the entrance to the stretching zone 107, the tracks 103 are fixed to carriages 133 which in turn are mounted on an adjusting screw 135. The screw 135 is also provided with threads 137 and 139 of opposite pitch which mesh with corresponding threads formed in the carriages themselves, and is supportd by end bearing plates 141 and a center support bearing 145 fixed to a cross bar 147 of the frame 87. A guide rod 149, fixed to the bearing plates 141, slidably supports the carriages 133 and prevents rotation of the same as the screw 131 is turned by a crank 151 fixed to one end thereof. As illustrated, the frame 87 is provided with elongated slots 153 to permit the cross bar 147 and its locking screws 155 to be adjusted in a direction longitudinally of the apparatus.

The apparatus of FIGURE 6 functions in substantially the same manner as the apparatus of FIGURES 1-3, with the exception that the film remains unsupported along a major portion of its travel through the film stretching zone. It will be noted that with this embodiment the transverse tensions exerted on the tracks 105 as the film is advanced therealong serve to urge or rotate the tracks into paths approaching those which the film beads tend to assume in response to the longitudinal tensions, as applied by the take-up rolls 93 and 95. As with the procedure practiced with the apparatus of FIGURES 1–3, the film 97 is preferably preheated prior to stretching and may be additionally heated during actual stretching if desired.

The method of the present invention may be further practiced by an apparatus as illustrated in FIGURES 7 and 8 wherein a conventional film 157, having a web 159 and longitudinal beaded edges 161, is guided through a film-stretching zone 163 by a plurality of pairs of cooperating rollers or discs 165, while being subjected to longitudinal stretching tensions as applied by take-up rolls 167 and 169. The rollers 165 of each pair of rollers are of identical construction and are carried by shafts 171 which in turn are rotatably mounted in yoke 173. As shown in FIGURE 8, the rollers 165 of each pair of rollers are spaced apart to permit the film web 159 to pass freely therebetween, and are preferably provided with roughened or knurled peripheral surfaces to prevent the film beads from sliding relative thereto as the longitudinally stretching tensions are applied. The pairs of rollers 165 at the entrance of the stretching zone 163 serve to nip the film and are preferably positively driven at identical uniform speeds by suitable means as shown at 175 to meter the film at a desired rate.

In using the apparatus of FIGURES 7 and 8, the film 157 is preferably preheated and then laced between the pairs of cooperating rollers 165 and the take-up rolls 167 and 169. The yokes 173 adjacent the take-up rolls are mounted for movement transverse to the film path and adjusted laterally to impose the desired transverse stretching tensions on the film web as it moves through the terminal portion of the stretching zone 163. The pairs of rollers 165 at the exit of the stretching zone 163 are driven by the movement imparted to the film beads, and since the transverse tensions arising from the forces required to stretch the film transversely as the film moves toward the exit of the stretching zone are unrestrained, the film beads are subject to a minimum of friction at the exit of the stretching zone.

In lieu of the arrangement illustrated in FIGURES 7 and 8, it will of course be apparent that pairs of rollers 165 at the entrance to the stretching zone 163 may be replaced by short track sections, as shown in FIGURE 6, or any other suitable means which will provide a necessary grip or snubbing effect on the film beads at this location.

While preferred embodiments of the invention have been shown and described, it is to be understood that changes and variations may be made without departing from the spirit and scope of the invention as defined in the appended claims.

I claim:

1. Apparatus for biaxially orienting a thermoplastic film having a web and beaded longitudinal edges including means for advancing the film longitudinally at a substantially uniform rate of speed, take-up means spaced longitudinally from and operative at a greater speed than said film advancing means whereby successive portions of the film are stretched longitudinally as they approach said take-up means, means positioned immediately adjacent to and in trailing relationship with said film take-up means for positively directing the beaded edges of the successive portions of the film along diverging paths as they approach and move into said take-up means while leaving the remaining portions of the film beaded edges traveling between said film advancing and take-up means generally unrestrained in a transverse direction and free to assume diverging, concave arcuate paths of travel in response to the stretching tensions applied to the film, and means for heating the film at least prior to stretching thereof.

2. Apparatus for biaxially orienting a thermoplastic film having a web and beaded longitudinal edges including means for advancing the film longitudinally at a substantially uniform rate of speed, take-up means spaced longitudinally from and operative at a greater speed than said film advancing means whereby successive portions of the film are stretched longitudinally as they approach said take-up means, means positioned between said film advancing and take-up means for guiding the film beaded edges along substantially parallel paths as they leave said film advancing means and for directing the beaded edges of the successive portions of the film along diverging paths as they approach and move into said take-up means, the remaining portions of the film beaded edges traveling between said film and advancing take-up means being generally unrestrained in a transverse direction and assuming diverging, concave arcuate paths of travel in response to the stretching tensions applied to the film, and means for heating the film at least prior to stretching thereof.

3. Apparatus as defined in claim 2 wherein said means for directing the beaded edges of the successive portions of the film along diverging paths includes pairs of cooperating rotatable discs disposed directly adjacent to said take-up means, the discs of each pair of discs being positioned to engage peripheral portions thereof with the film beaded edges and being spaced from each other to permit the film web to pass freely therebetween.

4. Apparatus as defined in claim 2 wherein said means for directing the beaded edges of the successive portions of the film along diverging paths includes short tracks which are disposed directly adjacent to said take-up means for slidably engaging with the film beaded edges, and further including means for adjusting the transverse spacing between said tracks and means for supporting said tracks for free movement about axes extending perpendicular to a plane substantially parallel to the film web to thereby permit self-adjustment of said tracks in response to the stretching tensions applied to the film.

5. Apparatus as defined in claim 2 wherein said means for guiding the film beaded edges along substantially parallel paths as they leave said film advancing means and for directing the beaded edges of the successive portions of the film along diverging paths includes elongated flexible tracks which slidably engage with the film beaded edges, and further including means for fixing the exit ends of said tracks against movement relative to said take-up means, means for laterally adjusting the ends of said tracks to vary the spacing therebetween, and means supporting the entrance ends of said tracks for floating movement toward and away from said take-up means whereby said tracks are free to flex into diverging, concave arcuate paths in response to the stretching tensions applied to the film.

6. Apparatus for biaxially orienting a thermoplastic film having a web and beaded longitudinal edges including means for advancing the film longitudinally at a substantially uniform rate of speed, take-up means spaced longitudinally from and operative at a greater speed than said film advancing means whereby successive portions of the film are stretched longitudinally as they approach said take-up means, a pair of flexible tracks positioned between said film advancing and take-up means for slidably engaging with the beaded edges of the film, means pivotally supporting said tracks at their opposite ends, means for fixing the exit ends of said tracks against longitudinal movement relative to said take-up means, means for laterally adjusting the exit ends of said tracks to vary the spacing therebetween and thereby direct the film beaded edges along diverging paths as they approach and move into said take-up means, means supporting the entrance ends of said tracks for floating movement toward and away from said take-up means whereby said tracks are free to flex into diverging, concave arcuate paths in response to the stretching tensions applied to the film, means for heating the film at least prior to stretching thereof and means for cooling the stretched film as it moves into said take-up means.

7. Apparatus for biaxially orienting a thermoplastic film having a web and beaded longitudinal edges including means for advancing the film at a substantially uniform rate of speed, means spaced longitudinally from and in trailing relationship with said film advancing means for guiding and nipping the film whereby successive longitudinal portions of the film are longitudinally stretched as they approach said film advancing means, pairs of rotatable discs positioned to engage peripheral portions thereof with the beaded edges of the film as they approach said film advancing means and direct the same along diverging paths while leaving the remaining portions of the film beaded edges traveling between said film nipping and advancing means generally unrestrained in a transverse direction and free to assume diverging, concave arcuate paths in response to the stretching tensions applied to the film, the discs of each pair of discs having faces disposed in opposing and spaced apart relationship to permit the film web to pass freely therebetween, and means for heating the film at least prior to stretching thereof.

8. A method for biaxially orienting a continuous thermoplastic film having a web and beaded longitudinal edges including the steps of continuously advancing the film longitudinally along a path, heating the film progressively along its length during the advancement thereof, tensioning successive portions of the heated film in a longitudinal direction at a first position located along the path of film advancement, nipping the advancing film at a second position located in trailing relationship with the first position to thereby cause the successive portions of the advancing film to stretch in a longitudinal direction as they approach and pass into the first position, stretching the film web in a transverse direction by directing the beaded edges of the successive portions of the heated film along diverging paths as they approach the first position while the remaining portions of the film beaded edges traveling between the second and first positions are generally unrestrained in a transverse direction and free to assume diverging, concave paths of travel in response to stretching tensions applied to the film, and cooling the stretched portions of the film.

9. A method for biaxially orienting a continuous thermoplastic film having a web and beaded longitudinal edges including the steps of continuously advancing the film longitudinally along a path, heating the film progressively along its length during the advancement thereof, tensioning successive portions of the heated film in a longitudinal direction at a first position located along the path of film advancement, nipping the advancing film at a second position located in trailing relationship with the first position to thereby cause the successive portions of the advancing film to stretch in a longitudinal direction as they approach and pass into the first position, stretching the film web in a transverse direction by sequentially engaging only the beaded edges of the successive portions of the heated film as they approach the first position and directing the same along diverging paths while the remaining portions of the film beaded edges traveling between the second and first positions are generally unrestrained in a transverse direction and free to assume diverging, concave paths of travel in response to the stretching tensions applied to the film, and cooling the stretched portions of the film.

10. A method for biaxially orienting a thermoplastic film having a web and beaded longitudinal edges including the steps of engaging the film at a first position and advancing the same at a substantially uniform rate of speed, nipping the film at a second position to induce longitudinal tensioning along that portion of the film approaching and immediately adjacent to the first position, stretching the film web in a transverse direction by engaging the beaded edges only along that portion of the film approaching and immediately adjacent to the first position and directing the same along diverging paths while the remaining portions of the beaded edges traveling between the second and first positions are generally unrestrained in a transverse direction and free to assume diverging, concave paths of travel in response to the stretching forces applied to the film, heating the film web to a higher temperature than the beaded edges thereof at least prior to stretching of the film, and cooling the stretched portions of the film.

References Cited in the file of this patent

UNITED STATES PATENTS

| | | |
|---|---|---|
| 2,297,645 | Bailey | Sept. 29, 1942 |
| 2,342,891 | Powers | Feb. 29, 1944 |
| 2,373,215 | Young | Apr. 10, 1945 |
| 2,618,012 | Milne | Nov. 18, 1952 |
| 2,728,941 | Alles et al. | Jan. 3, 1956 |
| 2,755,533 | Miller | July 24, 1956 |
| 2,778,057 | Clark | Jan. 22, 1957 |
| 2,923,966 | Tooke et al. | Feb. 9, 1960 |